(12) United States Patent
Larsson

(10) Patent No.: US 9,135,345 B1
(45) Date of Patent: Sep. 15, 2015

(54) GENERATING AND UPDATING ONLINE CONTENT USING STANDARDIZED TAGGED DATA

(71) Applicant: Jens Larsson, Dublin (IE)

(72) Inventor: Jens Larsson, Dublin (IE)

(73) Assignee: Google Inc., Mountain View, CA (US)

( * ) Notice: Subject to any disclaimer, the term of this patent is extended or adjusted under 35 U.S.C. 154(b) by 53 days.

(21) Appl. No.: 13/715,352

(22) Filed: Dec. 14, 2012

(51) Int. Cl.
*G06F 17/30* (2006.01)

(52) U.S. Cl.
CPC ................................ *G06F 17/30864* (2013.01)

(58) Field of Classification Search
CPC ................ G06F 17/30011; G06F 17/30014; G06F 17/30861; G06F 17/30864; G06F 17/30876; G06F 17/30882; G06F 17/3089; G06F 17/30893; G06F 17/30896
USPC ............. 707/705, 709; 705/14.1, 14.4, 17.72, 705/14.73
See application file for complete search history.

(56) References Cited

U.S. PATENT DOCUMENTS

| | | | |
|---|---|---|---|
| 6,349,307 B1* | 2/2002 | Chen | 707/999.003 |
| 2007/0055569 A1* | 3/2007 | Subramanian et al. | 705/14 |
| 2009/0164312 A1* | 6/2009 | Nadig | 705/14 |
| 2010/0131373 A1* | 5/2010 | Kubasov | 705/14.73 |
| 2012/0084812 A1* | 4/2012 | Thompson et al. | 725/34 |

\* cited by examiner

*Primary Examiner* — Hares Jami
(74) *Attorney, Agent, or Firm* — Foley and Lardner LLP; John D. Lanza

(57) ABSTRACT

Methods, and systems, including computer programs encoded on computer-readable media, for managing content associated with a content campaign of a content provider are disclosed herein. In one aspect, the present disclosure is directed to a system of generating and updating online content using standardized tagged data. The system may periodically crawl a document that includes one or more document reference tags. The system may identify at least one document reference tag and corresponding tagged data. The system may receive a request for content to display. The system may select an item of content comprising a content reference tag corresponding to the at least one document reference tag. Responsive to the request for content, the system may replace the content reference tag with the corresponding tagged data to assemble an item of content. The system may transmit the assembled content for display.

20 Claims, 11 Drawing Sheets

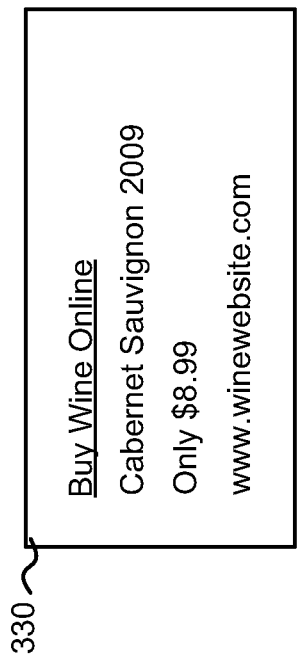

```
<html>
<head>
<AwAd title="{AwTag:T1} sale"
    row1="Buy this phone now, only
    row2="{AwTag:T2}, unlocked"
    DisplayUrl:"www.phoneswebsite.com/PhoneS2"
    Keywords="{AwTag:T1}, cheap phone, Cheap {AwTag:T1}, best phone"
    AdGroup:"phones"/>
</head>
<body>
...
<AwTag id="T1">Phone S2</AwTag>
...
<AwTag id="T2">$499</AwTag>
...
</body>
</html>
```

402 — `<html>`, `<head>`
404 — AwAd block
406 — `<AwTag id="T1">Phone S2</AwTag>`
408 — `<AwTag id="T2">$499</AwTag>`

FIG. 4B

GENERATING AND UPDATING ONLINE CONTENT USING STANDARDIZED TAGGED DATA

BACKGROUND

Content providers often sell their products or services using the Internet. A content provider may manage a website with multiple webpages publishing information and content related to products or services offered by the content provider. These webpages may be created manually by webpage administrators. Alternatively, the webpages may be generated automatically based on content management systems and/or inventory control systems. For example, for an online retailer, the webpages for the retailer's products can be automatically generated based on content in a product and inventory database. As a result, the content provider may have numerous webpages to manage and keep track of.

To promote products and services on the Internet, the content provider may create multiple online content items that mention product details (e.g., product description, product price, etc.). The content provider may have a separate online content item (e.g., advertisement) for each product or service promoted on their webpages. However, information and content on the content provider's webpages relating to products being offered (e.g., product price) frequently changes.

SUMMARY

At least one aspect is directed to a computer implemented method of managing content associated with a content campaign of a content provider. The method can include a content server periodically crawling a document that includes one or more document reference tags. The method can include identifying at least one document reference tag and corresponding tagged data. The method can include the content server storing the at least one document reference tag in association with the corresponding tagged data in a memory element. The method can include the content server receiving a request for content to display. The method can include selecting an item of content comprising a content reference tag corresponding to the at least one document reference tag. The method can include retrieving from the memory element the corresponding tagged data associated with the document reference tag. The method can include replacing the content reference tag with the corresponding tagged data to assemble an item of content responsive to the request. The method can include transmitting the assembled content for display.

In some implementations, the method can include identifying at least one of a content group identification, a display URL, content text, and a keyword. In some implementations, the tagged data includes a tag name. In some implementations, the tagged data includes one or more parameters where each parameter includes a parameter name and data content. The at least one of the one or more parameters can include data content specifying a tag name. The tag name value can be determined based on crawling the document. In some implementations, at least one of the parameters identifies at least one of a price, quantity, discount percentage. In some implementations, at least one of the parameters identifies a product description.

In some implementations, the method can include obtaining the document on a predetermined intermittent basis. The method can include crawling the document to identify an additional document reference tag and tagged data. Responsive to the identification, the method can include generating one or more additional content based, at least in part, on the additional tagged data.

In some implementations, the tagged data includes content update data for updating a second content associated with the content campaign.

In some implementations, the method can include determining content update data from the tagged data using the standardized document reference tag. The method can include updating the second content stored in a database of the content server with the content update data. In some implementations, the content update data includes an updated price corresponding to the second content.

At least one aspect is directed to a system for managing content comprising a web page crawler and data storage. In some implementations, the system includes one or more processing circuits. The system can periodically crawl a document that includes one or more document reference tags. The system can identify at least one document reference tag and corresponding tagged data. The system can store the at least one document reference tag in association with the corresponding tagged data in a memory element. The system can receive a request for content to display. The system can select an item of content comprising a content reference tag corresponding to the at least one document reference tag. The system can retrieve from the memory element the corresponding tagged data associated with the document reference tag. The system can replace the content reference tag with the corresponding tagged data to assemble an item of content responsive to the request. The system can transmit the assembled content for display.

At least one aspect is directed to a computer-readable storage medium having instructions to manage content associated with a content campaign of a content provider stored thereon. The instructions can comprise instructions to periodically crawl a document that includes one or more document reference tags. The instructions can comprise instructions to identify at least one document reference tag and corresponding tagged data. The instructions can comprise instructions to store the at least one document reference tag in association with the corresponding tagged data in a memory element. The instructions can comprise instructions to receiving a request for content to display. The instructions can comprise instructions to select an item of content comprising a content reference tag corresponding to the at least one document reference tag. The instructions can comprise instructions to retrieve from the memory element the corresponding tagged data associated with the document reference tag. The instructions can comprise instructions to replace the content reference tag with the corresponding tagged data to assemble an item of content responsive to the request. The instructions can comprise instructions to transmit the assembled content for display.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 3A-C illustrate a content provider webpage having tagged data used to update content in accordance with an illustrative embodiment;

FIGS. 4A-C illustrates a content provider webpage data including tagged data and content generated based on the tagged data in accordance with an illustrative embodiment;

Like reference numbers and designations in the various drawings indicate like elements.

DETAILED DESCRIPTION

To reach Internet customers, content providers (e.g., advertisers) may utilize websites to offer and sell products or services. A website may consist of multiple webpages, with each webpage containing information and content (e.g., an advertisement, image, text, video, multimedia element) for one or multiple products or services. For example, a web-store platform may have thousands of webpages automatically generated based on the inventory or product database. The content provider webpages can display such product or services information as product image, product price, product description, etc.

Using a content management system (e.g., advertisement server), the content providers can create and manage online content to promote the products and/or services offered on their websites. A content provider may sell thousands of products online. To promote these products, the content provider may have numerous content items promoting specific products (e.g., at least the best-selling products) or product categories, making the content items relevant for searching users. A content item can be an online advertisement. An exemplary advertisement can include any combination of the following data: a headline, a product description, a display uniform resource locator ("URL"), a destination URL, and other product or webpage information. The product description can include product name, description, price, number of items left in stock, etc.

The content items associated with the product may be updated when the content provider webpage is changed to reflect the product changes. For example, when a product information or price is updated or a product is sold out, the online content may be updated. Content providers can "tag" information on their webpages in a standardized way that the content management system can understand. The content management system can include a content provider webpage crawler configured to scan content provider webpages, and upon detection of standardized tagged data, update corresponding content items using the detected standardized tagged data.

For example, product description data in a content item, stored in the content management system, can include standardized tag identifiers for various product details (e.g., a tag identifier for a product price). The content provider webpage crawler can scan the content provider webpage, detect the tag identifiers and tag data, and update the information in the content item using the detected tag data. When the product or service details change on the content provider's webpage, the corresponding content items are automatically updated to reflect those changes. As a result, the content provider does not have to manually update numerous (e.g., hundreds or thousands) of content items with product or service detail changes appearing on their webpages.

Figure 3A:
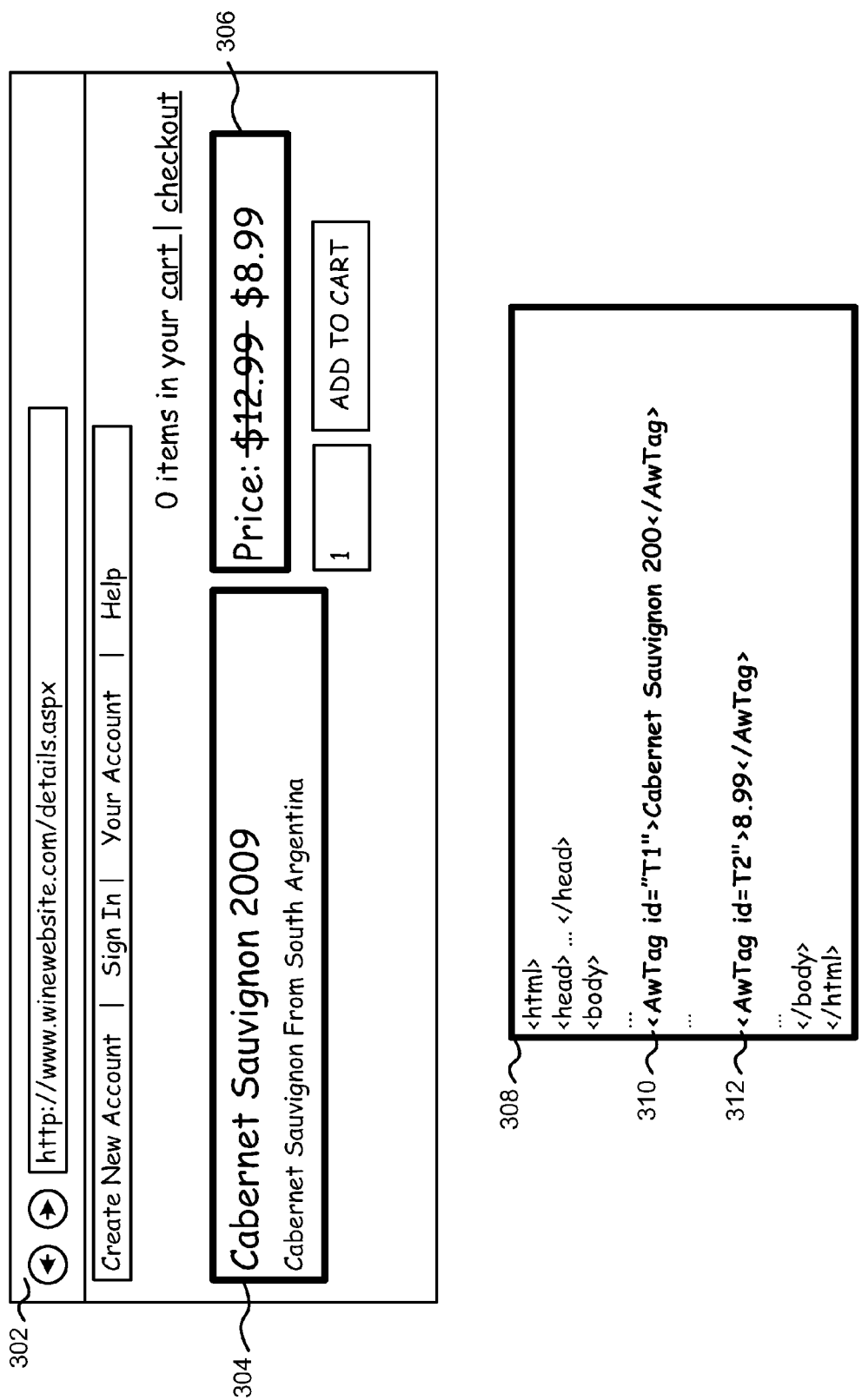
Figure 3B:
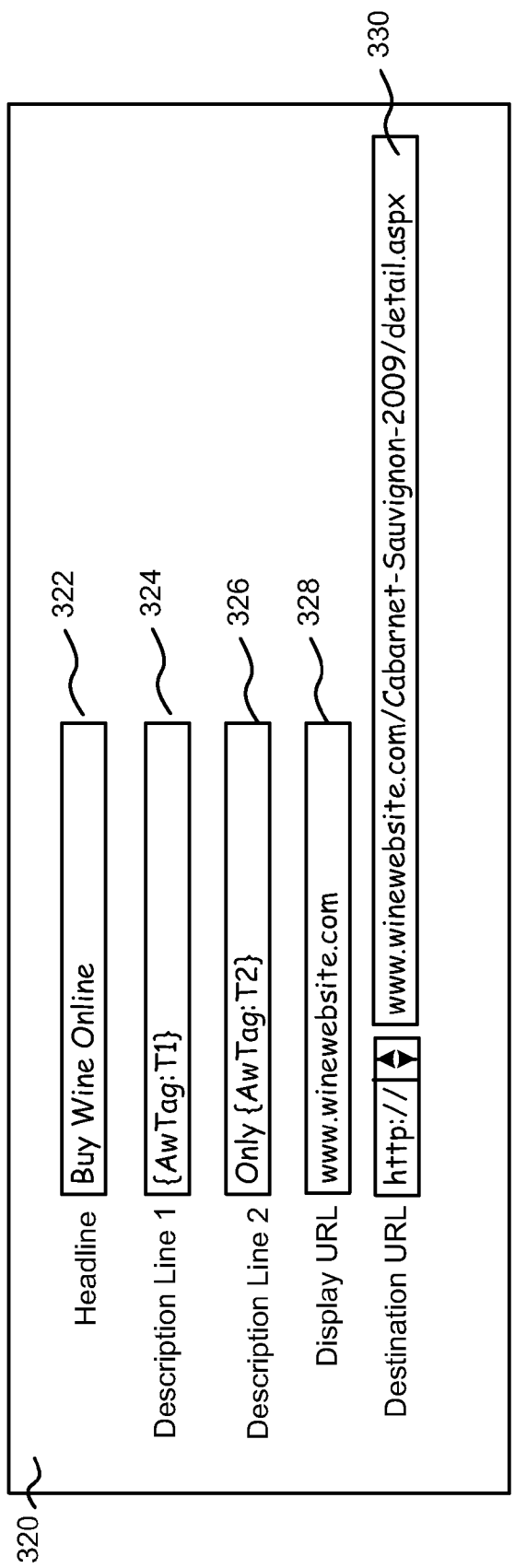
Figure 4A:
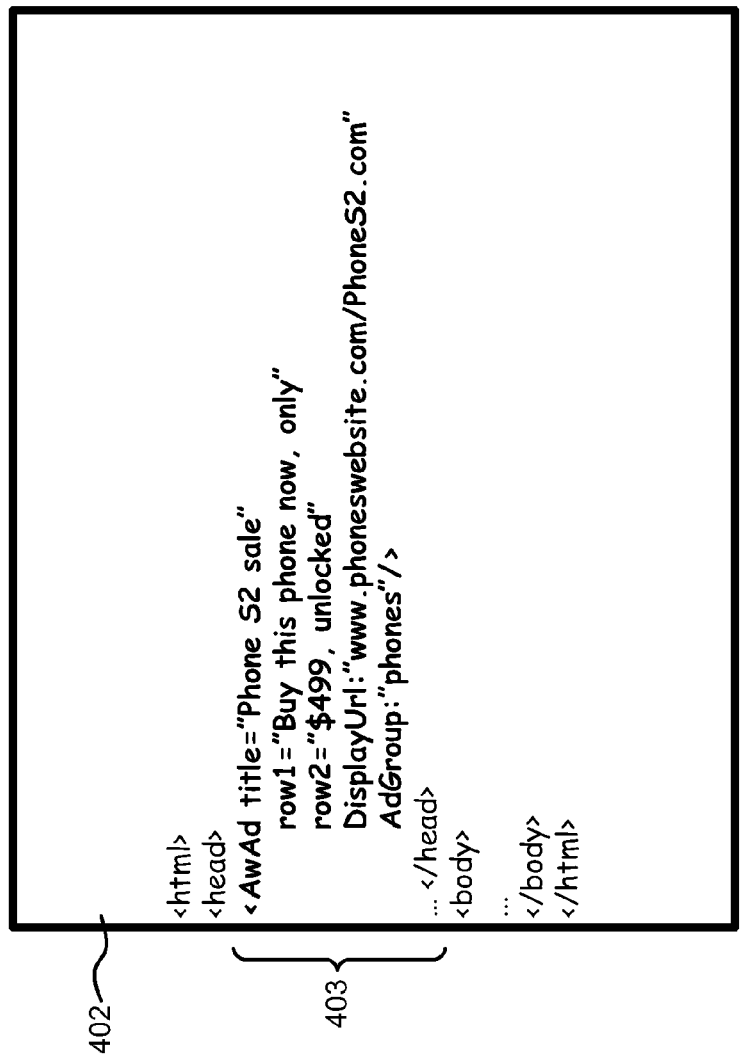

In these embodiments, content items created by the content providers can contain tagging information including tag identifiers as illustrated in FIG. 3B. A content provider webpage source code (e.g., HyperText Markup Language ("HTML") code) can include the tag identifiers contained in the content item, as well as corresponding product or service data, as illustrated in FIGS. 3A and 4A-B.

In other embodiments, a content provider's webpage may include information sufficient to automatically generate a new content item. In these embodiments, the tagged data included on the content provider's webpage may include keywords, content text, destination URL, tags, etc. The content provider webpage crawler can intermittently scan the webpage, and detect the new content data. The content management system can generate new content items based on the detected tagged data.

Accordingly, the tagged data included in content providers' webpages can be used to update existing content items as well as create new content items. For example, a change to a price associated with a particular product reflected in the tagging information on the content provider's webpage will be reflected in a content item associated with this product. Accordingly, the content provider can build "long-tail" campaigns with specific content items (e.g., advertisements) for each product, and the content items can be automatically updated with changes to price or other data associated with the products using the tagged data.

Although the embodiments are described in the context of an content management system (e.g., advertisement management system), other types of systems can employ the standardized tagging techniques described herein. For example, a webpage enabling users to manage their finances can use the standardized tags, and a feature in another product (e.g., Excel) could import the data included in the standardized tags, and have it update itself to reflect changes on the webpage. In some embodiments, using consistently tagged prices, products names and other product or service attributes across various websites on the Internet, an effective and accurate comparison of product or service prices can be automatically performed.

Figure 1:
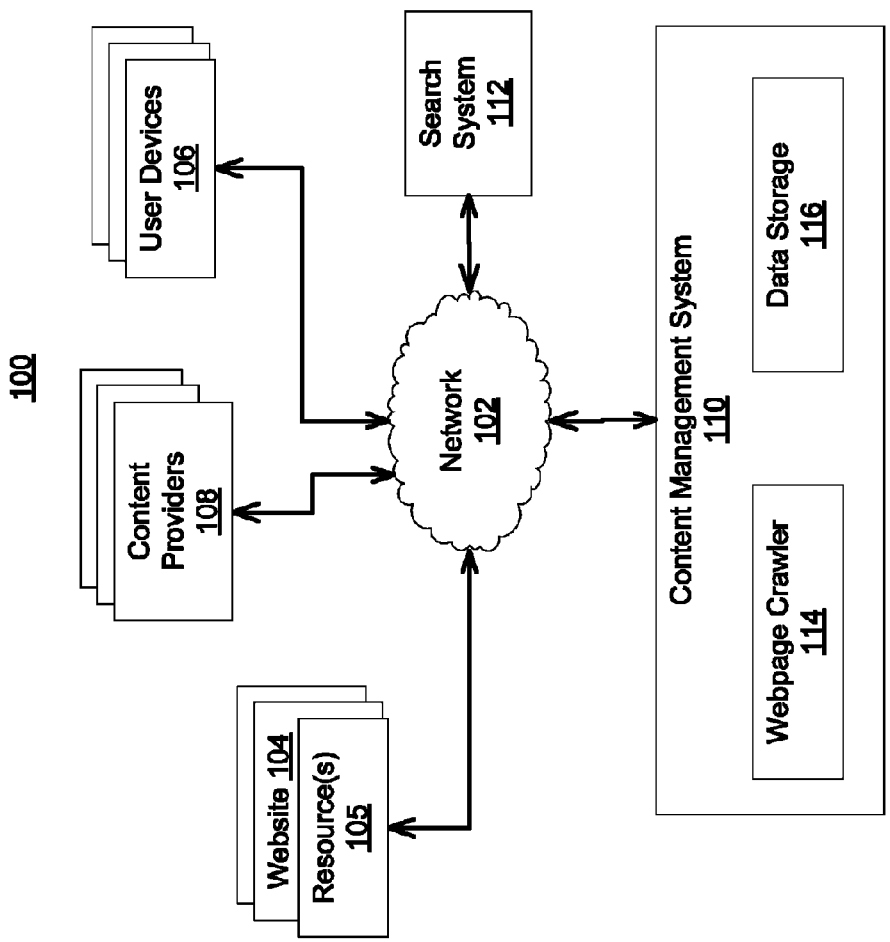
FIG. 1 illustrates a block diagram of an example environment in which a content management system manages online content in accordance with an illustrative embodiment.

FIG. 1 is a block diagram of an example environment 100 in which the content management system 110 manages various content items associated with content providers. The content management system 110 enables content providers 108 to create and manage custom content items. The content items are stored in a data storage 116 in the content management system 110. In brief overview, and in some implementations, the content management system 110 a web page crawler 114 configured to crawl, scan and/or parse a document to identify document reference tags and corresponding content data. The content management system 110 can include a data storage 116 configured to store document reference tags, content data, content, and/or other information to facilitate content management. The content management system 110 can include at least one processing circuit configured to facilitate content management.

In further detail, in some implementations, the content management system 110 includes a webpage crawler 114 configured to scan webpages of various content providers for standardized tagged information. In some implementations, the web page crawler 114 can include an ant, automatic indexer, bots, web spiders, and/or web robots. For example, when the webpage crawler 114 detects standardized tagged information (e.g., a document reference tag) on a content provider's webpage, one or more content items, stored in the data storage 116, corresponding to the products or services offered on the webpage are updated with information from the detected tagging information. In some embodiments, the content management system 110 and/or the webpage crawler 114 can maintain a list of webpages that the crawler 114 intermittently scans. In other embodiments, the content provider can initiate the scanning of a webpage (e.g., by clicking on a button on a user interface).

The content management system 110 and/or the webpage crawler 114 can maintain standardized tags (e.g., XML tags) that would indicate to the content provider webpage crawler 114 that the tag includes data for updating an existing content or creating a new content. For example, as illustrated in FIGS. 3A-C, the tags "AwTag" and "AdTag" are used. However, any other names can be used for tags. For example, instead of using specific tags such as "AdTag", existing standard HTML tags (e.g., <span>) can be used to include some of the content information. In this example, AdTag can be translated to span class="AdTag", and that AwTag can be translated to meta name="AwAd". In another example, the content can be generated using a scripting language (e.g., JavaScript), and the creation of content or updating of existing content would be implemented using the scripting language. Accordingly, the tags can be replaced with a short script code or any code that is not displayed to the user of the web browser.

When the content provider webpage crawler 114 encounters the "AwTag" tag, it can determine that the tag data includes data for creating new content item or updating an existing content item. In some embodiments, multiple tags can be used. For example, a first tag would indicate that the tag contents include data for a new content item, while a second tag different from the first tag would indicate to the content provider webpage crawler 114 that the tag contents include data for an existing content item.

The environment 100 includes a network 102, such as a local area network (LAN), a wide area network (WAN), a wireless network, the Internet, or a combination thereof. The network 102 connects websites 104, user devices 106, content providers 108, and the content management system 110. Environment 100 may include any number of websites 104, user devices 106, and content providers 108.

A website 104 includes one or more resources 105 associated with a domain name and hosted by one or more servers. An example website is a collection of webpages formatted in hypertext markup language (HTML) that can contain text, images, multimedia content, and programming elements, such as scripts.

A resource 105 is any data that can be provided over the network 102. The resource 105 is identified by a resource address that is associated with the resource 105, such as a URL. Resources 105 can include webpages, word processing documents, portable document format (PDF) documents, images, video, programming elements, interactive content, and feed sources, to name only a few. Resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages, such as, JavaScript® or ECMAScript®.

A user device 106 is an electronic device that is under the control of a user. User device 106 is configured to request and receive resources 105 over the network 102. Example user devices 106 include personal computers, mobile communication devices, and other devices that can send and receive data over the network 102. In some implementations, the user devices 106 may include a user application, such as a web browser, to facilitate the sending and receiving of data over the network 102.

The user devices 106 can request resources 105 from a website 104. In turn, data representing the resource 105 can be provided to user device 106 for presentation by user device 106 (e.g., on an electronic display, as an audible sound via a speaker, or a combination thereof). The data representing the resource 105 can include data specifying a portion of the resource or a portion of a user display (e.g., a presentation location of a pop-up window or in a slot of a webpage) in which content items can be presented. These specified portions of the resource 105 or user display are referred to as content slots (e.g., advertisement slots).

To facilitate searching of the vast number of resources 105 accessible over the network 102, environment 100 may include a search system 112 that identifies resources 105 by crawling and indexing resources 105 provided on websites 104. Data about resources 105 can be indexed based on the resource 105 with which the data is associated. The indexed and, optionally, cached copies of resources 105 are stored in a search index (not shown).

User devices 106 can submit search queries to the search system 112 over the network 102. In response, the search system 112 accesses the search index to identify resources 105 that are relevant to the search query. In one illustrative embodiment, a search query includes one or more keywords. The search system 112 identifies resources 105 that are responsive to the query, provides information about resources 105 in the form of search results and returns the search results to the user devices 106 in search results pages. A search result can include data generated by the search system 112 that identifies the resource 105 that is responsive to a particular search query, and can include a link to the resource 105. An example search result can include a webpage title, a snippet of text or a portion of an image extracted from webpage 104, a rendering of the resource 105, and the URL of the webpage 104. Search results pages can also include one or more content slots in which content can be presented.

A search result page can be sent with a request from the search system 112 for the web browser of the user device 106 to set an HTTP (HyperText Transfer Protocol) cookie. A cookie can represent, for example, a particular user device 106 and a particular web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifier can be anonymized and is not connected with user names.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

When the resource 105 or search results are requested by a user device 106 or provided to user device 106, the content management system 110 receives a request for content to be provided with the resource 105 or search results. The request for content can include characteristics of the content slots that are defined for the requested the resource 105 or search results page, and can be provided to content management system 110. For example, a reference (e.g., URL) to the resource 105 for which the content slot is defined, a size of the content slot, and/or media types that are available for presentation in the content slot can be provided to content management system 110. Similarly, keywords (i.e., one or more words that are associated with content) associated with a requested the resource 105 ("resource keywords") or a search query for which search results are requested can also be provided to the content management system 110 to facilitate identification of content that is relevant to the resource 105 or search query.

Based on the data included in the request for content, the content management system 110 can select content items that are eligible to be provided in response to the request ("eligible content"). For example, eligible content can include content items having characteristics matching the characteristics of content slots and that are identified as relevant to specified resource keywords or search queries. In some implementations, content items having targeting keywords that match the resource keywords, the search query, or portions of the search query are selected as eligible content by content management system 110.

The content management system 110 selects an eligible content item for each content slot of the resource 105 or of a search results page. The resource 105 or search results page is received by the user device 106 for presentation by the user device 106.

Content providers 108 can submit, to the content management system 110, campaign parameters (e.g., targeting keywords and corresponding bids) that are used to control distribution of content. Content providers 108 can create custom content items to be served to users. The content item can contain product or services information, as well as a URL of a destination webpage. In some embodiments, the content items include standardized tags. In these embodiments, the data for these tags is located on the content provider webpage.

Figure 2:
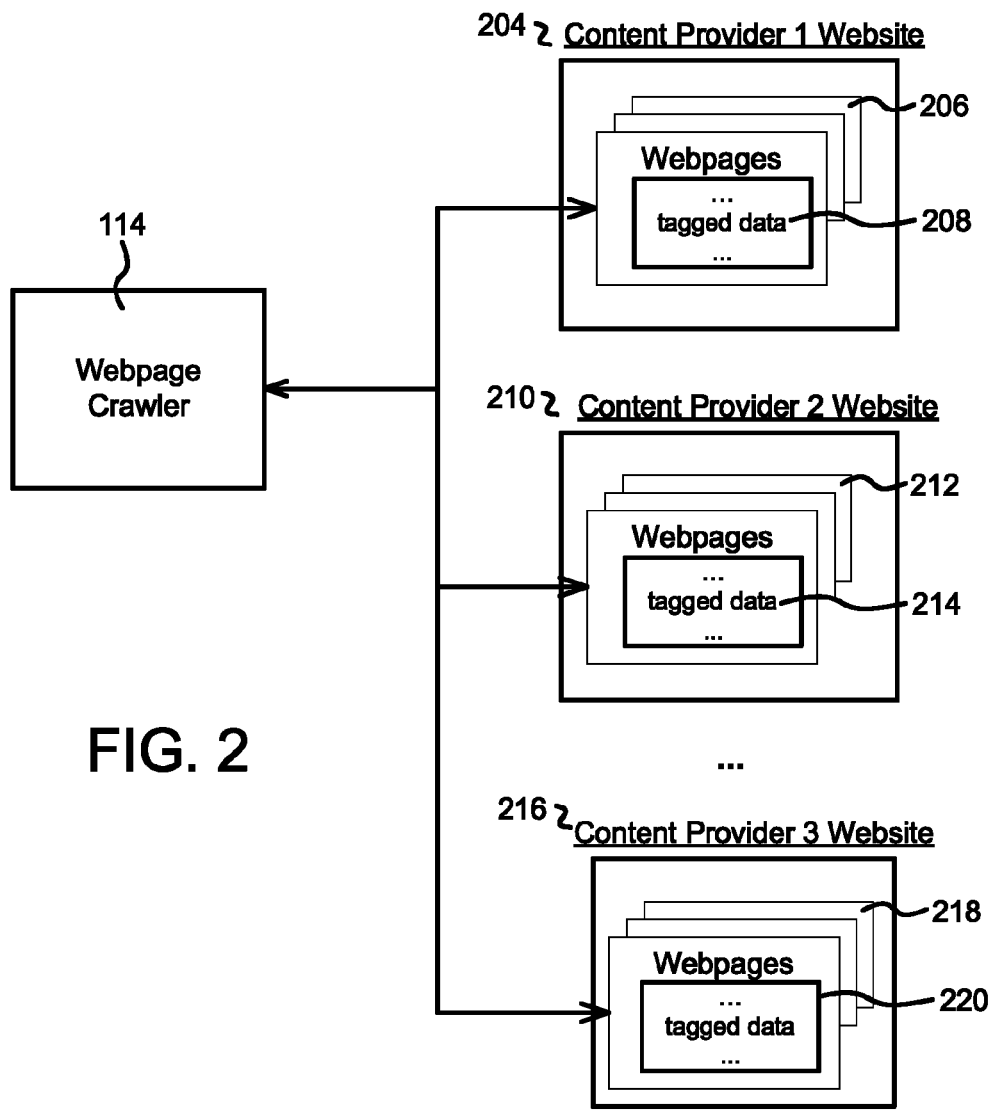
FIG. 2 is a block diagram illustrating a content provider webpage crawler and multiple content provider webpages in an accordance with an illustrative embodiment.

FIG. 2 is a block diagram of the webpage crawler 114 and content provider websites 204, 210 through 216. As shown, the content provider websites 204, 210 through 216 include one or more webpages 206, 212 through 218. Each content provider webpage may in turn include tagged data 208, 214 through 220. In some embodiments, the tagged data contains data indicating updates to existing content items (e.g., price change to a product). FIG. 3A illustrates tagged data 208 (e.g., 310, 312) including product data such as product name and product price. Other tags can be used to describe existing content items or content items that need to be generated using the tags. In some embodiments, the content of certain tags can be limited. For example, a price tag may only include numbers and currency symbols. In this example, updated or new content having the price tag would not have to be pre-approved to reflect changes in the price.

In other embodiments, the tagged data contains data including content data for new content item. FIG. 4A illustrates an example of tagged data including data for a new content item (e.g., 404, 406, and 408). Once the webpage crawler 114 detects information on the content provider webpage (e.g., using the "AwAd" tag) that includes tagging information having data for existing or new content, the corresponding existing content items stored in the content data store 116 are updated with the detected data, or new content items are created and stored in the content data storage 116.

In some embodiments, the webpage crawler 114 can manage or have access to a list of content provider websites or a site-map including content provider websites. The webpage crawler 114 can visit the websites on the list of content provider websites on an intermittent basis, when requested by an administrator of the content management system 110, or when requested by a content provider. In some embodiments, upon receiving a request from a content provider 108 for content items be automatically updated or generated, the webpage crawler 114 scans the webpages associated with the content provider 108 and updates the content items with up to date product information.

Although only content provider websites 204, 210 through 216 are shown, the webpage crawler 114 can scan any number of content provider websites. Although only a single webpage crawler 114 is shown, the content management system 110 can include multiple webpage crawlers. As shown in FIG. 1, the webpage crawler 114 can be implemented in the content management system 110. In other embodiments, the webpage crawler 114 can be locally implemented in a desktop content management system. In other embodiments, the content management system 110 may provide an application programming interface ("API") that can be utilized to automatically generate new content items and/or edit existing content items.

FIGS. 3A-3C illustrate a content provider webpage 302 having tagged data 308 used to update contents of a content 330. As shown in FIG. 3A, the URL associated with the content provider webpage 302 is www_DOT_winewebsite_DOT_com/Cabernet Savignon_DOT_aspx. When a web browser loads the webpage 302, the user is presented with information relating to the Cabernet Sauvignon wine.

The product description area 304 in the webpage 302 displays product description, and the price information area 306 displays wine price to the user. As illustrated, the pricing information area 306 indicates that the price of this particular wine was adjusted from $12.99 to $8.99. The webpage 302 enables the user to purchase the Carnet Sauvignon 2009 at the price indicated in the price information area 306.

The content provider webpage 302 includes HTML data 308 including tagged data 310 and 312. As shown, the tagged data 310 includes <AdTag id="T1"> Cabernet Sauvignon 2009</AdTag>, which incorporates a product description as identified by a tag identifier "T1". The tagged data 312 includes <AdTag id="T2">8.99</AdTag>. Accordingly, the "T2" tag identifier identifies the current price for the product (i.e., $8.99). As the price for the product changes, the tagged data 312 is updated automatically by a computing system or by a webpage administrator with the new price. In some embodiments, the webpage 302 is automatically generated and/or updated by a content management system and/or inventory control system.

FIG. 3B illustrates an exemplary user interface that the content provider uses to create or update the content item 320. The content information specified by the content provider includes content headline 322, description lines 324 and 326, display URL 328, and destination URL 330. Instead of providing the product description in the description lines 324 and 326, the content provider specified references to data on the content provider webpage (e.g., {AdTag:T1} and {AdTag:T2}). The tagged data 310 specifies the actual product description (i.e., value for T1), while the tagged data 312 specifies the current price for the product (i.e., value for T2).

When the content item is served to the user, it will display the product description and price that was specified in the tagged data 310 and 312. FIG. 3C illustrates the content item 330 that was generated using the tagged data 310 and 312. Accordingly, the content item 330 includes up to date data including current price for the product. Advantageously, the content provider does not have to manually update the content when an aspect of the content changes (e.g., pricing data).

Figure 4C:
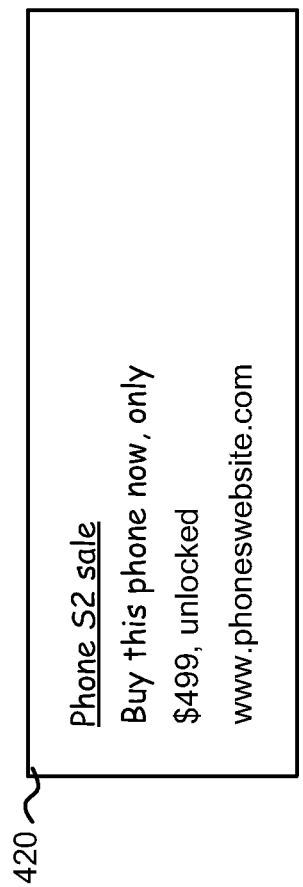

FIG. 4A illustrates HTML data 402 associated with a webpage. The data 402 includes tagged data 403 containing sufficient information for generating new content (e.g., a new advertisement) for the content provider. The tagged data 404 includes a title, description in row 1 and row 2, a display URL, and adgroup data. In particular, the title is "Phone S2 sale". Row 1 is "Buy this phone now, only" and row 2 is "$499, unlocked!". The display URL is specified as "www.phoneswebsite.com/PhoneS2". The adgroup having value "phone" indicates that an adgroup identified as phone is assigned the new content. FIG. 4C illustrates new content 420 that is generated based on the tagged data found in the HTML data 402. The new content 420 reflecting price information (i.e., $499) can be displayed to a user on a webpage in response to the user conducting a search using the search system 112. Accordingly, new content is automatically generated upon detection and interpretation of the data such as data 402.

FIG. 4B illustrates another example of standardized tagged data. The data 402 includes tagged data 404, 406, and 408 containing sufficient information for generating a new content item for the content provider. The tagged data 404 includes a title, description in row 1 and row 2, a display URL, keywords, and adgroup data. In particular, the title is specified as "{AdTag:T1} sale", and the value for the "T1" tag is assigned in the body of the HTML data 402. Tagged data 406 includes "Phone S2" value for the "T1" tag identifier. Row 1 of the content is "Buy this phone now, only" and row 2 is "{AdTag:T2}, unlocked!". The value for the "T2" tag is specified in the tagged data 408 in the body of the HTML data 402.

The tagged data 404 specifies display URL as "www.phoneswebsite.com" for the content item. If not specified, the display URL and/or destination URL can default to the URL of the webpage that included the tagged data 404. Keywords for the content include value of "T1" tag (i.e., "Phone S2"), "cheap phone", "Cheap Phone S2", and "best phone". Accordingly, the content may be served to a user entering one of the keywords included in the list of keywords in the tagged data 404. The tagged data 404 specifies that the adgroup, associated with the content provider's content campaign, for the content item is "phones". The content provider's content campaign may include one or more adgroups, with each adgroup including a set of keywords. The adgroup specified in the tagging information 404 can include a new adgroup or an existing adgroup.

When the webpage crawler 114 detects the tagged data 404, 406, and 408 (e.g., upon detection of "AwTag" tag), the content management system 110 generates a new content item using the data in the tagged data 404, 406, and 408. FIG. 4C illustrates the new content item 420 generated based on the tagged data in the HTML data 402 associated with the content provider's webpage. Accordingly, new content item can be automatically created by detecting and interpreting tagged data embedded in the content provider's webpages.

In some implementations, standardized tags can be used, with a pre-defined way to structure the attributes. For example, already existing HTML tags (e.g., "<span>" tag) can be used to include information regarding the content shown on the webpage for detection by the webpage crawler 114. For example, <span class="AdTag" id="price"> or <span class="AdTag price"> can be used to indicate the price of a product. Accordingly, <span class="AwTag"> would replace <AwTag>. For example, referring to FIG. 4B, the following tag can be part of the head of the webpage: <meta name="AwAd" data-title="{AdTag:T1} sale" data-row1="Buy this phone now, unlocked" . . . etc.!> such that <meta name="AwAd" replaces <AwAd> and "data-title" replaces "title", in order for the tags to conform with HTML standards.

However, attributes that can be assigned to the "<span>" tag may be limited for older versions of HTML and XHTML (e.g., versions prior to HTML5). In other embodiments, content updating and new content generation can be performed using similar techniques described herein, but using a scripting language such as JavaScript (instead of HTML tagging).

In some embodiments, if the webpage containing the tagged data 402 is removed, then the content associated with this data can be removed from the content management system 110. In these embodiments, the content associated with the tagged data 402 will no longer be displayed to users. If the price, product name or other data included in the tagged data 402 is changed, the content is updated accordingly after the webpage crawler 114 detects the change.

Although only product description and product price tags are shown in FIGS. 3A-3B and FIGS. 4A-4B, any other tags can be used that are associated with a content campaign. For example, a tag can be included that specifies that the content item (e.g., advertisement) related to a product should be running or paused (e.g., based upon inventory levels of the product). In another example, tags can specify maximum bids which could be automatically calculated by an inventory control system or another system to optimize cost per conversion for each product based on both inventory levels and margins.

In some implementations, the content (e.g., advertisements) can be constructed in real-time "dynamically" when they are to be presented to a user (e.g., either on a search webpage or as an online advertisement in a content network). The webpage crawler 114 visits the webpage in real time (i.e., runtime) when the content is about to be displayed. From the website the webpage crawler 114 would fetch the current tagged data, construct the new content, and present it to the user. In this implementation, the actual values of the tagged data would not necessarily be stored on the content management system 110 but instead be read directly from the content website when needed.

Figure 5:
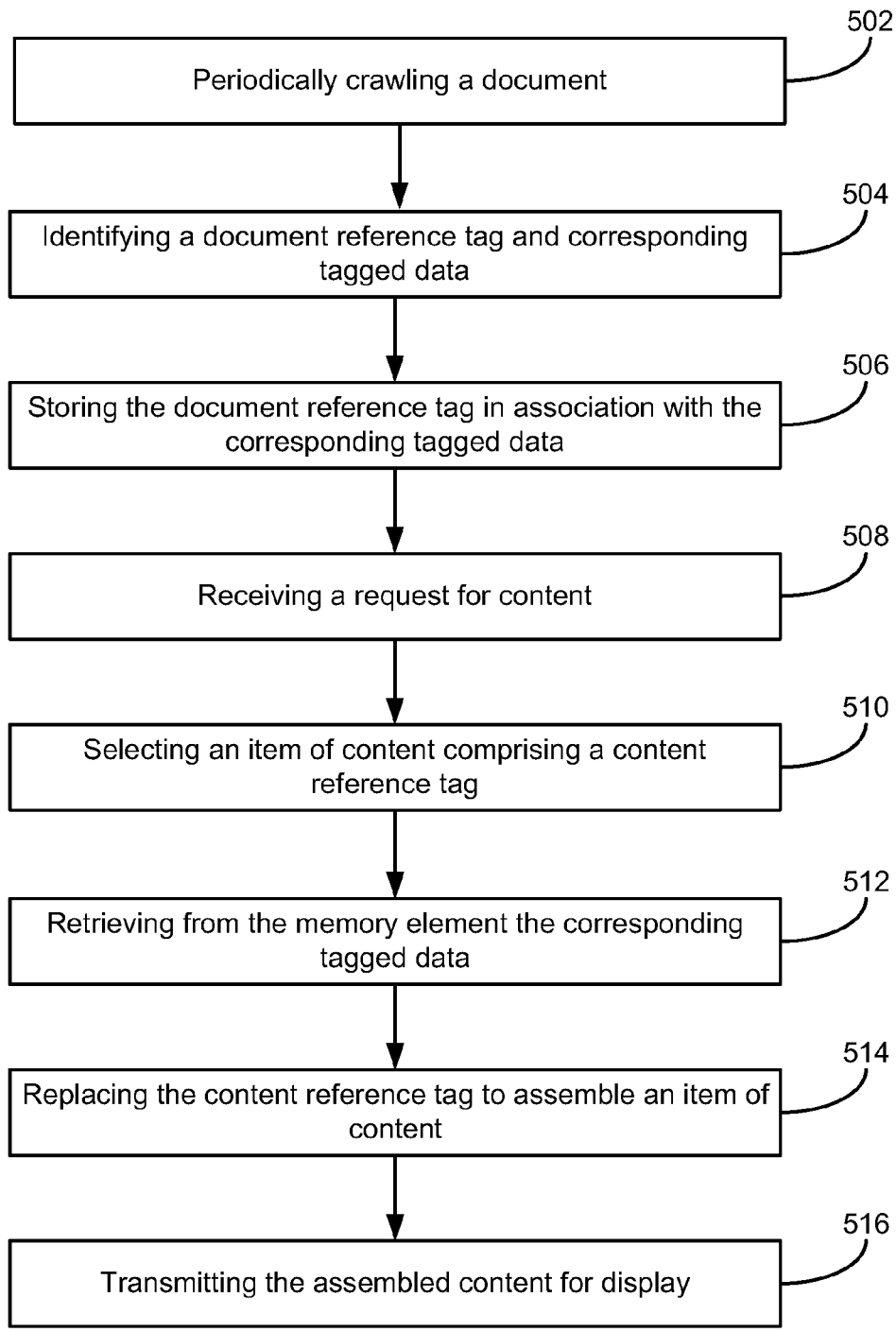
FIG. 5 is a flow diagram of an example process for generating content using content provider webpage data in accordance with an illustrative embodiment.

FIG. 5 is a flow diagram of a method 500 for generating new content items based on tagged data in accordance with an illustrative implementation. The method 500 can be implemented on a computing device. In one embodiment, the method 500 is encoded on a computer-readable medium that contains instructions that, when executed by a computing device, cause the computing device to perform operations of the process 500. In brief overview, and in some implementations, at step 502 the method can periodically crawl a document that includes one or more document reference tags. At step 504, the method can identify at least one document reference tag and corresponding tagged data. At step 506, the method can store the document reference tag in association with the corresponding tagged data in a memory element. At step 508, the method can receive a request for content to display. At step 510, the method can select an item of content comprising a content reference tag corresponding to the at least one reference tag. At step 512, the method can retrieve from the memory element the corresponding tagged data associated with the document reference tag. At step 514, the method replace the content reference tag to assemble an item of content. At step 516, the method can transmit the assembled content for display.

In further detail, at step 502 the method can include periodically crawling a document that includes one or more document reference tags. In some implementations, the document may include an online webpage or website corresponding to a domain, word processing document, HTML document, or another type of document that includes information related to online content. The document may include at least one of text, symbols, characters, media content, hyperlinks, document reference tags, tagged data, or other information. In some implementations, the document reference tag may refer to or correspond to tagged data. For example, a document that includes document reference tags may refer to a document that includes at least one of tagged data, tag name, tag value, parameter name, and data content. For example, a document reference tag may refer to "<AwAd title "Phone S2 sale"</AwAd>", where tagged data may refer to one or more of the corresponding elements of the document reference tag, such as, e.g., a tag name and a parameter, where each parameter may further include a parameter name and a data content. Further to this example, the tag name may include "AwAd"; the parameter name may include "title"; and the parameter value may refer to "Phone S2 Sale".

In some implementations, the method may include receiving or obtaining the document and storing it on the content server. For example, a document owner/provider, such as, e.g., a web page owner, author, or other content producer, may upload or otherwise transmit the document to the content management server. In some implementations, the method may include crawling, scanning or parsing a document residing on a server or other storage associated with the document owner/provider. In some implementations, the method may include crawling the document responsive to a request to crawl the document made by a user such as, e.g., the document owner/provider, content provider, advertiser, etc. In some implementations, the method may include periodically crawling the document based on a predetermined time interval. For example, the document owner or content provider may indicate, to a web crawler or content management system, a time interval such as, e.g., hourly, daily, weekly, bi-weekly, monthly, or any other time interval. In some implementations, the web crawler may crawl the document responsive to an event or condition. The event may include a document update event where a document owner or content creator updates an aspect of the document. In some implementations, a condition may refer to an inventory condition such as, e g, running out of inventory of a certain product, getting new inventory, price change, product change, etc.

For example, tagged data can include a predetermined tag name (e.g., "AwAd" as illustrated in FIG. 4A) that indicates that the body of the tag include data for generating a new content item or updating an existing content item. The parameters in the tagged data can include content data such as content title, description (e.g., multiple rows), display URL, keywords, adGroup, and other content related information. The parameters can include tag identifiers (e.g., 406, and 408 in FIG. 4A) whose values are specified in the body of HTML source code associated with the content provider's webpage.

According to one embodiment, entire content item texts including the price data, possibly with keywords and/or other data needed to build the content item are embedded on the content provider's webpage. The tags may not necessarily have to be embedded in the web-page file (e.g., HTML, PHP, or APSX). There can also be a reference to a different file where the tagged data resides. In that case a reference will be included in the content site that is tagged in a standardized way and has an attribute pointing to the file with the actual data.

In some implementations, at step 504, the method can include identifying a document reference tag and corresponding tagged data. For example, upon crawling the document, the method may parse text of the document to identify a document reference tag. In some implementations, the method may compare text or other information of the document with standardized document reference tags to facilitate identifying document reference tags. For example, the characters "AWtag" may indicate a document reference tag. In another example, the method may parse all or a portion of the tagged data to determine whether the format corresponds to a standardized document reference tag format. Upon identifying a standardized document reference tag, or an indication of a document reference tag, the method can include identifying corresponding tagged data. For example, the method may determine that a title, description, and other information associated with the content is based on the contents of the tagged data. The content data can comprise one or more of content group identification, a display URL, content text, and one or more keywords. For example, the method may identify the tag "AwAd", parameter "title", and data content "Phone S2 Sale". The method may identify additional tagged data, such as, e.g., parameter "row1" and corresponding data content "Buy this phone now, only", parameter "row2" and corresponding data content "$499, unlocked!", parameter "DisplayUrl" and corresponding data content www.phoneswebsite.com/PhoneS2, and parameter "AdGroup" and corresponding data content "phones".

At step 506, the method can include storing the document reference tag in association with the corresponding tagged data in a memory element. For example, the document reference tag and tagged data may be stored in a memory, storage, database or other data repository associated with a content management server. In some implementations, one or more component of the tagged data may be stored in a manner to facilitate content management. For example, a tag name, parameter, and content data may be associated with each other. In another example, a tag name and a plurality of corresponding parameters and content data may be associated with each other.

At step 508, the method can include receiving a request for content to display. The request for content may be received from a web page. For example, upon a user visiting a web page with one or more content slots, the web page may send a request to a content server for content for the content slot. The request may include information to facilitate selecting and/or providing content for display. For example, the request may include information about the content slot (e.g., position, length, width), information about the web page for which the content request is being made (e.g., keywords), etc.

At step 510, the method can include selecting an item of content. The item of content may include a content reference tag that corresponds to the identified at least one document reference tag of the document. The method may select the item of content from a plurality of content items stored in a content repository. For example, if the identified document reference tag and corresponding tagged data includes the parameter name "title", the method may select a content that includes a tag for parameter "title". Further to this example, if the document reference tag includes the parameter name "DisplayUrl", the method may include selecting a content that includes a content reference tag with a parameter name "DisplayUrl". In some implementations, the method may include identifying a content that includes at least one content reference tag that corresponds to at least one document reference tag. In other implementations, the method may include selecting a content where all the content references tags of the content correspond to document reference tags of the document; e.g., selecting a content such that all the tags of the content can be replaced with content data from the document. In other implementations, one or more content reference tag or corresponding parameter may be optional. For example, if the parameter name "row2" is optional, then the content may be transmitted in response to a request even if the document does not include a document reference tag with a parameter name corresponding to "row2". In this example, the "row2" of the content may be left blank, or it may be replaced with default content predetermined by the content provider or content management server.

At step 512, the method can include retrieving from the memory element the corresponding tagged data associated with the document reference tag. Upon retrieving the corresponding tagged data, the method may include replacing the content reference tag with the corresponding tagged data, at step 514. In some implementations, the method may include assembling an item of content responsive to the request for content. For example, upon receiving a request for content to display on a web page, the method may select a content item with content reference tags corresponding to at least one document reference tags and replace the content reference tags with content data corresponding to the document reference tags. In some implementations, the method may include storing the assembled content in a content repository. In some implementations, the method may include storing the assembled content with the replaced content data along with the content reference tags.

Upon assembling the content, the method can transmit the assembled content for display at step 516. In some implementations, the method may include transmitting the content to a web page, application or computing device that sent the request.

Figure 6:
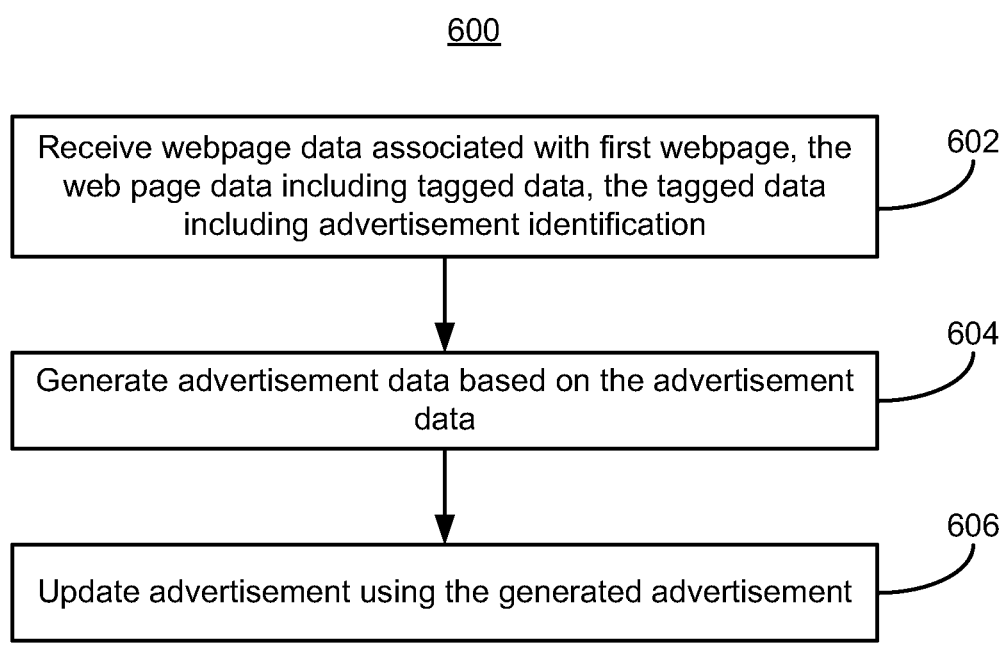
FIG. 6 is a flow diagram of an example process for updating content using content provider webpage data in accordance with an illustrative embodiment.

FIG. 6 is a flow diagram of a process 600 for updating existing content items based on tagged data detected on an content provider webpage in accordance with an illustrative embodiment. The process 600 can be implemented on a computing device. In one embodiment, the process 600 is encoded on a computer-readable medium that contains instructions that, when executed by a computing device, cause the computing device to perform operations of the process 600.

The process 600 includes receiving webpage data associated with a webpage. The webpage is associated with a content provider's website. The webpage data includes standardized tagged data as illustrated in FIGS. 3A, 4A-B (e.g., tagged data 310, and 312). The tagged data can include a content identification associated with a content item stored in the data storage 116 of the content management system 110. In some embodiments, the content identifier is not provided in the tagged data. In these embodiments, a content item is identified based on information associated with the content provider associated with the webpage, as well as data contained in the tagged data such as product name.

The tagged data further includes variable data. In some embodiments, the tagged data can include a tag comprising a tag name, and one or more parameters, with each parameter including a parameter name and data content. For example, a parameter for description (e.g., a parameter name is "T1" in FIG. 3A), a parameter for product price (e.g., parameter name is "T2" in FIG. 3A), and/or a parameter indicating whether to stop serving the content to users can be included in the tagged data.

Content data is generated (604) based on the variable data or tagged data in the received webpage data. A content item identified by the content identification in the tagged data is updated (606) using the generated content data. In particular, various attributes associated with the content item can be updated. The content attributes can include product description, product price, product availability, and other types of product information.

Figure 7:
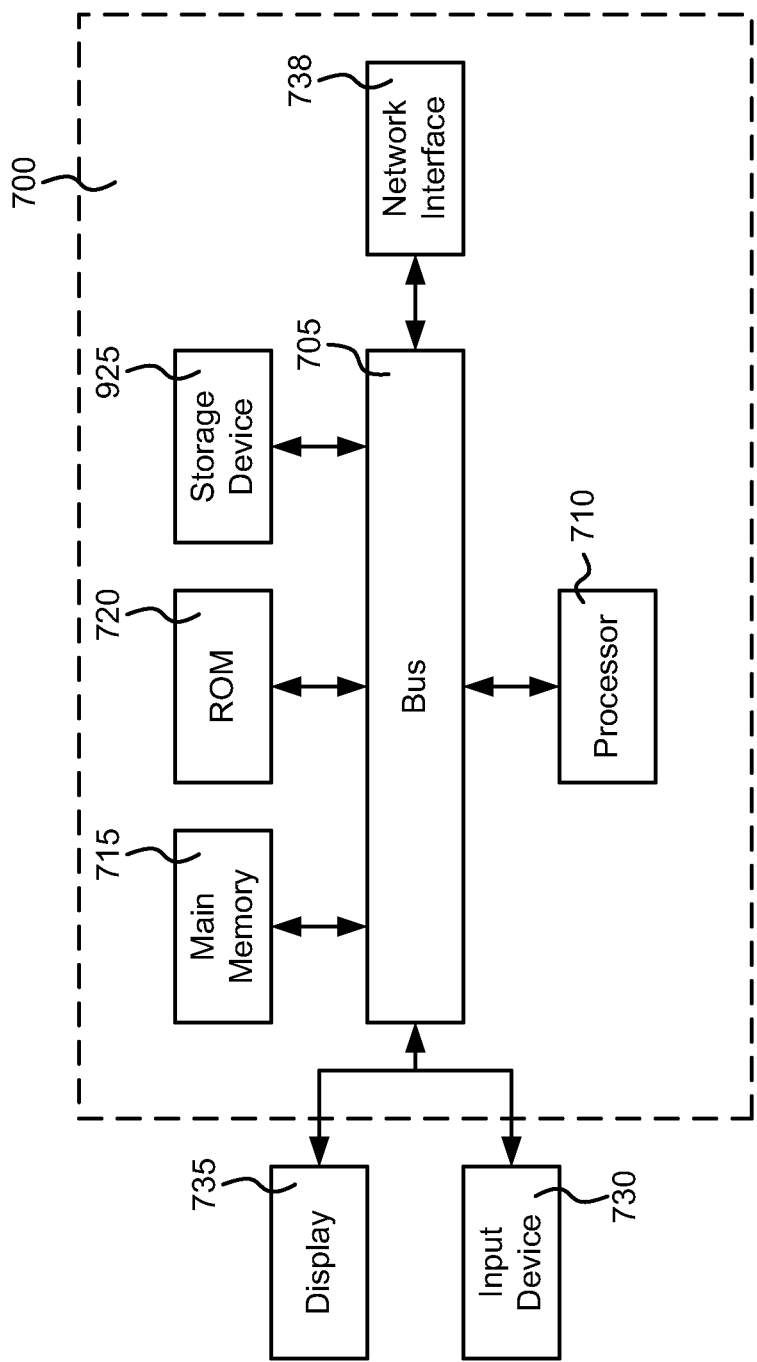
FIG. 7 is a block diagram of a computer system in accordance with an illustrative embodiment.

FIG. 7 is a block diagram of a computer system in accordance with an illustrative implementation. The computer system or computing device 700 can be used to implement devices 104, 202, and 204 and/or the remote computing device 106, etc. The computing system 700 includes a bus 705 or other communication component for communicating information and a processor 710 or processing circuit coupled to the bus 705 for processing information. The computing system 700 can also include one or more processors 710 or processing circuits coupled to the bus for processing information. The computing system 700 also includes main memory 715, such as a random access memory (RAM) or other dynamic storage device, coupled to the bus 705 for storing information, and instructions to be executed by the processor 410. Main memory 715 can also be used for storing position information, temporary variables, or other intermediate information during execution of instructions by the processor 710. The computing system 700 may further include a read only memory (ROM) 710 or other static storage device coupled to the bus 705 for storing static information and instructions for the processor 710. A storage device 725, such as a solid state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information and command selections to the processor 710. In another implementation, the input device 730 has a touch screen display 735. The input device 730 can include a cursor control, such as a mouse, a trackball, or cursor direction keys, for communicating direction information and command selections to the processor 710 and for controlling cursor movement on the display 735.

According to various implementations, the processes described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to effect illustrative implementations. Thus, implementations are not limited to any specific combination of hardware circuitry and software.

Although an example computing system has been described in FIG. 7, implementations of the subject matter and the functional operations described in this specification can be implemented in other types of digital electronic circuitry, or in computer software embodied on a tangible medium, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of managing content associated with a content campaign of a content provider, the method comprising:
   periodically accessing, by a content server, a document that includes a document reference tag;
   identifying, by the content server, the document reference tag and corresponding tagged data;
   storing, by the content server, the document reference tag in association with the corresponding tagged data in a memory element;
   receiving, by the content server, a request for content to display on a webpage;
   selecting, by the content server, an advertisement comprising a content reference tag corresponding to the document reference tag based on a first parameter name of the content reference tag matching a second parameter name of the document reference tag;
   retrieving, by the content server from the memory element, the corresponding tagged data associated with the document reference tag;
   assembling, by the content server responsive to the request, the advertisement by replacing the content reference tag in the selected advertisement with the corresponding tagged data; and
   transmitting, by the content server, the assembled advertisement for display with the webpage on the display device.

2. The method of claim 1, further comprising:
   identifying at least one of a content group identification, a display URL, content text, and a keyword.

3. The method of claim 1, wherein the tagged data includes a tag name and one or more parameters, each parameter including a parameter name and data content.

4. The method of claim 3, wherein at least one of the one or more parameters includes data content specifying a tag name, and wherein a tag name value is determined based on crawling the document.

5. The method of claim 3, wherein at least one of the one or more parameters identifies at least one of a price, quantity, discount percentage.

6. The method of claim 3, wherein at least one of the one or more parameters identifies a product description.

7. The method of claim 1, further comprising:
   obtaining the document on a predetermined intermittent basis;
   crawling the document to identify an additional document reference tag and tagged data; and
   responsive to the identification, generating one or more additional content based, at least in part, on the additional tagged data.

8. The method of claim 1, wherein the tagged data includes content update data for updating a second advertisement associated with the content campaign.

9. The method of claim 8, further comprising:
   determining content update data from the tagged data using the standardized document reference tag; and
   updating the second advertisement stored in a database of the content server with the content update data.

10. The method of claim 9, wherein the content update data includes an updated price corresponding to the second advertisement.

11. A content management system for managing content comprising at least one processing circuit, a webpage crawler and data storage, the system configured to:
    periodically crawl a document that includes a document reference tag;
    identify the document reference tag and corresponding tagged data;
    store the document reference tag in association with the corresponding tagged data in a memory element;
    receive a request for content to display on a webpage;
    select an advertisement comprising a content reference tag corresponding to the at least one document reference tag based on a first parameter name of the content reference tag corresponding to a second parameter name of the document reference tag;
    retrieve from the memory element the corresponding tagged data associated with the document reference tag;
    assemble, responsive to the request, the advertisement by replacing the content reference tag in the selected advertisement with the corresponding tagged data; and
    transmit the assembled advertisement for display with the webpage on the display device.

12. The system of claim 11, wherein the system is further configured to:
    identify at least one of a content group identification, a display URL, content text, and a keyword.

13. The system of claim 11, wherein the tagged data includes a tag name and one or more parameters, each parameter including a parameter name and data content.

14. The system of claim 13, wherein at least one of the one or more parameters includes data content specifying a tag name, and wherein a tag name value is determined based on crawling the document.

15. The system of claim 13, wherein at least one of the one or more parameters identifies at least one of a price, quantity, discount percentage.

16. The system of claim 13, wherein at least one of the one or more parameters identifies a product description.

17. The system of claim 11, wherein the system is further configured to:
    obtain the document on a predetermined intermittent basis;
    crawl the document to identify an additional document reference tag and tagged data; and
    responsive to the identification, generate one or more additional content based, at least in part, on the additional tagged data.

18. A non-transitory computer-readable storage medium having instructions to manage content associated with a content campaign of a content provider stored thereon, the instructions comprising instructions to:
    periodically crawl a document that includes a document reference tag;
    identify the document reference tag and corresponding tagged data;
    store the document reference tag in association with the corresponding tagged data in a memory element;

receive a request for content to display on a webpage;

select an advertisement comprising a content reference tag corresponding to the at least one document reference tag based on a first parameter name of the content reference tag corresponding to a second parameter name of the document reference tag;

retrieve from the memory element the corresponding tagged data associated with the document reference tag;

assemble, responsive to the request, the advertisement by replacing the content reference tag in the selected advertisement with the corresponding tagged data; and transmit the assembled advertisement for display with the webpage on the display device.

19. The non-transitory computer-readable storage medium of claim 18, further comprising instructions to:

identify at least one of a content group identification, a display URL, content text, and a keyword.

20. The non-transitory computer-readable storage medium of claim 18, wherein the tagged data includes a tag name and one or more parameters, each parameter including a parameter name and data content.

\* \* \* \* \*